US007394632B2

(12) United States Patent
Arguello, Jr. et al.

(10) Patent No.: US 7,394,632 B2
(45) Date of Patent: Jul. 1, 2008

(54) LINE INTERFACE MODULE

(75) Inventors: Edward J. Arguello, Jr., Prior Lake, MN (US); Michael J. Nelson, Prior Lake, MN (US); Nathaniel D. Herman, Chanhassen, MN (US); Randall R. Holterman, Mequon, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 495 days.

(21) Appl. No.: 10/955,106

(22) Filed: Sep. 30, 2004

(65) Prior Publication Data

US 2006/0072284 A1 Apr. 6, 2006

(51) Int. Cl.

*H02H 3/00* (2006.01)
*H02H 7/00* (2006.01)

(52) U.S. Cl. .......................................................... 361/62

(58) Field of Classification Search .................... 361/62
See application file for complete search history.

(56) References Cited

U.S. PATENT DOCUMENTS 5,477,091 A * 12/1995 Fiorina et al. ................. 307/66
5,694,312 A * 12/1997 Brand et al. ................. 363/144
2004/0231875 A1* 11/2004 Rasmussen et al. ........... 174/50

* cited by examiner

*Primary Examiner*—Ronald W Leja
(74) *Attorney, Agent, or Firm*—Boyle Frederickson LLP; Alexander R. Kuszewski

(57) ABSTRACT

A power processing module for supplying power to a motion control device from a power source such as a utility power line, and related method of operation, are disclosed. The power processing module includes a first power input terminal, a first power output terminal, branch circuit protection circuitry coupled at least indirectly between the first power input terminal and the first power output terminal, and at least one bus bar coupling at least two of the first power input terminal, the first power output terminal, and the branch circuit protection circuitry.

23 Claims, 4 Drawing Sheets

LINE INTERFACE MODULE

CROSS-REFERENCE TO RELATED APPLICATIONS

Field of the Invention

The present invention relates to motion control systems and, in particular, relates to systems for delivering power to motion control systems and related systems.

BACKGROUND OF THE INVENTION

Motion control systems such as those employed in industrial environments typically require power from one or more power sources, in the form of primary and/or auxiliary power. Not uncommonly, different types or levels of power (e.g., DC or AC power), or powers having multiple different characteristics (e.g., different voltage levels, current levels, etc.) are required.

Typically, the power that is provided to the motion control systems is received from one or more power lines (e.g., a utility grid) and then converted into the desired forms of power. However, in certain embodiments, power can be received from power sources other than power lines, such as local power generation sources (e.g., local generators or batteries).

To provide the required forms of primary and/or auxiliary power to the motion control systems based upon the received power, many different front-end circuit components are often required. These front-end circuit components not only can provide power conversion, but also can serve other purposes as well, for example, circuit protection to protect against power spikes. For example, the National Electric Code requires that branch circuit protection be provided in connection with the delivery of power to motor controllers/motor drivers.

Among the many different circuit components that can be utilized in any given system are power conversion components, switching components such as contactors, protective components such as circuit breakers and fuses, filtering components and even additional power sources. Traditionally, these circuit components have been implemented on an "ad hoc" basis when motion control systems are installed.

The complexity, cost and inefficiency associated with identifying, purchasing and installing such front end components on such an ad hoc basis can be high. In particular, the installation, including wiring together, of circuit components can be difficult and costly. Further, the implementation of circuit components in this manner can result in the consumption of excessive panel space along or nearby the motion control systems. Indeed, because motor controllers/motor drivers often require high levels of power and current, the wiring used to connect the front end components must often be thick and consequently further increases the overall size of the assembly of front end components (for example, 3 gauge wire has an 8 inch bend radius).

Therefore, it would be advantageous if there was available to customers an improved mechanism or manner of implementing the power-related functionality traditionally provided by such ad hoc agglomerations of front-end circuit components. In particular, it would be advantageous if such an improved mechanism or manner of implementing such functionality was less costly and complicated to implement than existing ad hoc circuit implementations, and took up less panel space along/nearby the motion control systems.

BRIEF SUMMARY OF THE INVENTION

The present inventors have recognized that some or all of the front-end circuit components traditionally implemented in such an ad hoc manner in relation to motion control systems could instead be assembled into a single, standardized, and compact front-end power processing module. Further, the present inventors have recognized that such front-end circuit components implemented into such a module could in certain embodiments include a variety of components including circuit breakers and fuses, filtering components, and power conversion devices, for example.

Additionally, the present inventors have recognized that certain of the components incorporated into the power processing module can be compactly assembled, despite the fact that high-levels of power/current may be communicated among those components, by utilizing bus bars rather than wires to connect those components. Among the components that can be compactly assembled through the use of bus bars, in at least some embodiments, are branch circuit protection circuit components.

In particular, the present invention relates to a power processing module for supplying power to a motion control device. The power processing module includes a first power input terminal, a first power output terminal, branch circuit protection circuitry coupled at least indirectly between the first power input terminal and the first power output terminal, and at least one bus bar coupling at least two of the first power input terminal, the first power output terminal, and the branch circuit protection circuitry.

Further, the present invention relates to a method of providing power to a motion control device. The method includes providing a power processing device having a first power input terminal, a first power output terminal, branch circuit protection circuitry coupled at least indirectly between the first power input terminal and the first power output terminal, and at least one bus bar coupling at least two of the first power input terminal, the first power output terminal, and the branch circuit protection circuitry. The method additionally includes substantially enclosing the power processing device within a housing, and coupling the power output terminal of the power processing device to an input terminal of the motion control device.

Additionally, the present invention relates to a three-phase power processing device. The power processing device includes first, second and third power input terminals, and first, second and third power output terminals. The power processing device further includes first, second and third bus bars coupling the first, second and third power input terminals to first, second and third input ports of a component including a branch circuit protection device, respectively. The power processing device additionally includes fourth, fifth and sixth bus bars coupling first, second and third output ports of the component to the first, second and third power output terminals, respectively.

DETAILED DESCRIPTION OF THE INVENTION

Figure 1:
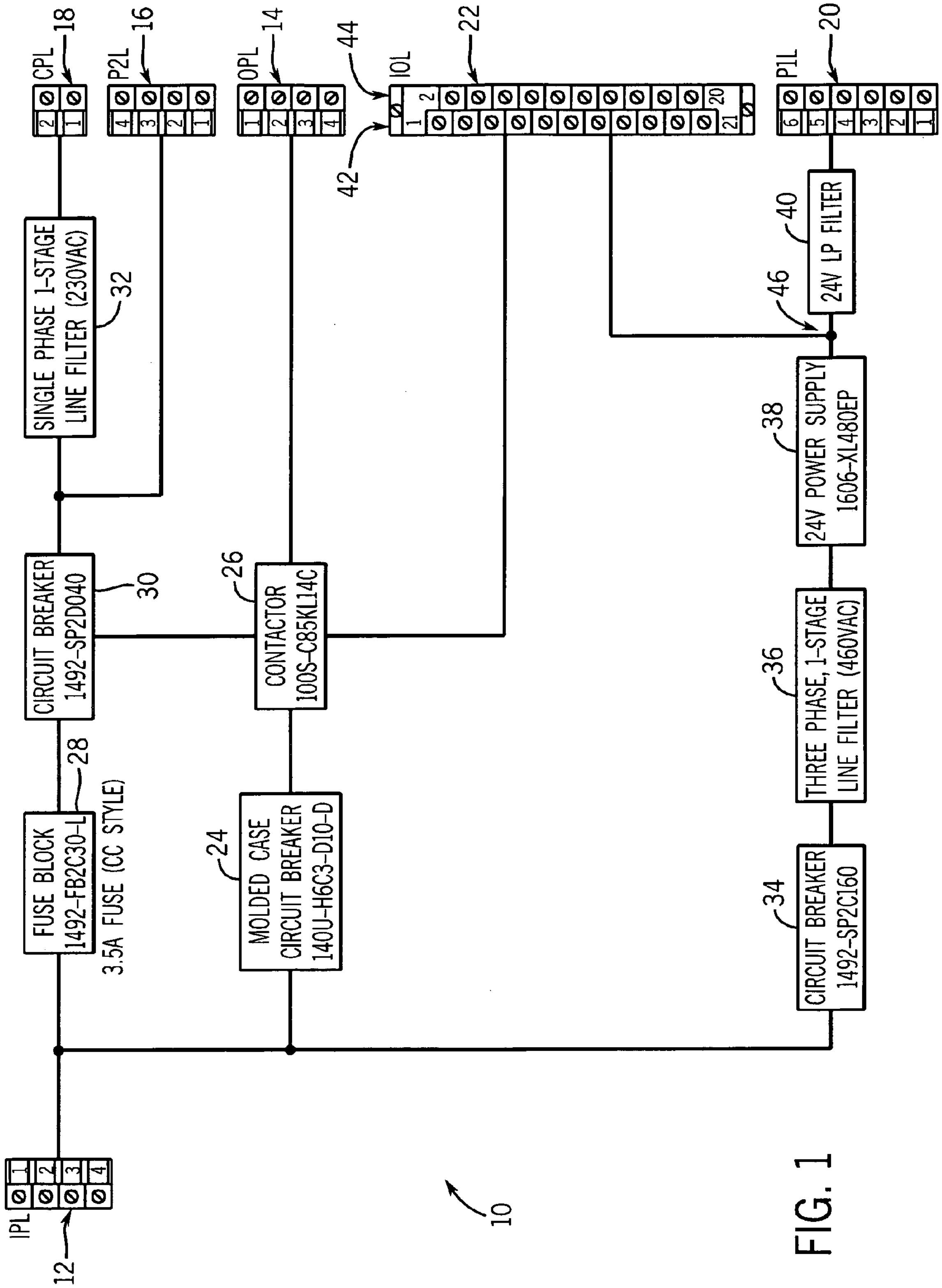
FIG. 1 is a schematic showing electronic components of a first exemplary embodiment of a power processing module.

Referring to FIG. 1, electronic components of a first exemplary embodiment of a power processing module or device 10 in accordance with one embodiment of the present invention are shown. The power processing device 10 is designed to allow for conversion of power from, in this embodiment, line power (e.g., from a utility) into power having appropriate level(s) and characteristic(s) for use by a motion control system such as a motor controller or motor driver (not shown), and thus the power processing device in the present embodiment can also be termed a "line interface module".

Depending upon the embodiment, the power processing device 10 can also provide power to other portions of a motion control system besides (or instead of) a motion controller/driver, for example, components such as programmable logic controllers (PLCs) or other devices that are commonly mounted on panels along with motion controllers/drivers. To the extent the claims set forth below refer to a "motion control device", this term is intended to encompass not merely a motor controller or motor driver, but rather is intended to encompass more broadly any one or more of the aforementioned devices or components that can be implemented in relation to a motion control system and/or related panel.

As shown, the power processing device 10 includes a power input terminal 12 that, in the present embodiment, is configured to be connected to a power line (e.g., from a utility) to receive line power. Additionally, the power processing device has first, second, third, fourth and fifth power output terminals 14, 16, 18, 20 and 22, respectively. The power processing device 10 allows for, therefore, output power of five different types (or otherwise having different characteristics) to be generated based upon the single type of power received at the power input terminal 12.

Further as shown in FIG. 1, the first power output terminal 14 provides high-voltage (e.g., either 230 or 460V), high-current (e.g., up to 75 A) power, and thus is a high-power output. This would typically be the primary high-power output of the power processing device 10, and be applicable, for example, toward providing power to a servo drive that will then drive a motor or the like. As shown, in order to provide this high-power at the power output terminal 14, input power from the power input terminal 12 is first provided through a circuit breaker 24 and then communicated further through a contactor 26, before then being communicated to the first power output terminal 14. The circuit breaker 24 can be a high-current (e.g., 125 A), 3-phase thermal and magnetic molded case circuit breaker such as the 140U-H6C3-D12-D circuit breaker available from Rockwell Automation of Milwaukee, Wis., the beneficial assignee of the present application. The contactor 26 can be also a high-current (e.g., 85 A), 3-phase contactor with auxiliary control. In certain embodiments, the contactor 26 could have one normally closed contact and four normally open contacts. The molded case circuit breaker 24 in certain embodiments is designed to provide branch circuit protection that would satisfy National Electric Code requirements for certain motor controllers/motor drivers.

Initially as shown in FIG. 1, the second power output terminal 16 provides non-filtered control power while the third power output terminal 18 provides filtered control power. Each of these power output terminals 16 and 18 is provided with its power from the power input terminal 12 by way of a fuse block 28 and a circuit breaker 30 that are coupled in series between the power input terminal and each of the power output terminals. Additionally, between the circuit breaker 30 and the third power output terminal 18 (but not between the circuit breaker 30 and the second power output terminal 16) is a filter 32, such that the power at the third power output terminal is filtered. In the embodiment shown, the power provided at the second and third power output terminals 16, 18 is high-voltage power (e.g., 230V) but is of moderate current. In particular, the fuse block 28 limits current to a low or moderate level (e.g., to 3.5 A) and in the present embodiment is a 1492-FB2C30-L fuse block available from Rockwell Automation. The circuit breaker 30 in the present embodiment is a 1492-SP2D040 circuit breaker also available from Rockwell Automation, which is a 4 A, two pole, 20 KA-interrupt-rated circuit breaker. The filter 32 in the present embodiment is a single-phase, one-stage line filter rated at 230 VAC.

As shown, the circuit breaker 30 is also coupled to the coil of contactor 26 via a changeover contact in the present embodiment. This ensures that a secondary control device must be operational for the contactor to engage. Although not shown, the circuit breaker 30 more particularly is mechanically linked to an auxiliary contact (e.g., a 1492-ASPH3 auxiliary contact available from Rockwell Automation), which in turn is wired to the input of the actuating coil of the contactor 26. If the circuit breaker 30 is tripped, the auxiliary contact will disengage the signal to the contactor, the contactor coil will de-energize and the contactor will open, cutting high current power. This ensures that the main power to a drive/motor is removed when the motion control system loses control power.

Still referring to FIG. 1, the fourth power output terminal 20 provides low voltage (e.g., 24V) filtered power. This power is provided from the power input terminal 12 by way of an additional circuit breaker 34, followed by an additional filter 36, followed by a power converter 38 and a filter 40. In the embodiment shown, the power output at the fourth output terminal 20 is DC power. The DC power is generated from the AC line power received at the power input terminal 12 by way of the power converter 38, which is an AC to DC power converter or rectifier. In the embodiment shown, the power converter 38 specifically can be a 24V rated power supply that converts 460V (or in alternate embodiments 230V or 120V) AC power into 224V DC power, such as the 1606-XL480EP power supply available from Rockwell Automation. With respect to the other components 34, 36 and 40, the circuit breaker 34 in the present embodiment is a 16 A general purpose circuit breaker having a 10 KA-interrupt-rating, such as the 1492-SP2C160 circuit breaker available from Rockwell Automation. The filter 36 in the present embodiment, which is positioned between the circuit breaker 34 and the power converter 38, is a 3-phase, 1-stage line filter (in this case rated at 460 VAC). As for the other filter 40, that filter in the present embodiment is a 24V low pass filter.

Finally, additionally as shown in FIG. 1, the fifth power output terminal 22 is an interface signal power terminal having first and second sets of pins 42 and 44, respectively. The first set of pins 42 receives signals from the auxiliary contacts of the contactor 26, providing status of the contactor to the motion system through three normally open contacts and one normally closed contacts. These auxiliary contacts are mechanically linked to the main contacts of the contactor 26. The second set of pins 44 is coupled to a junction 46 between the power converter 38 and the filter 40, and consequently outputs DC power from the power converter 38.

Figures 2, 3:
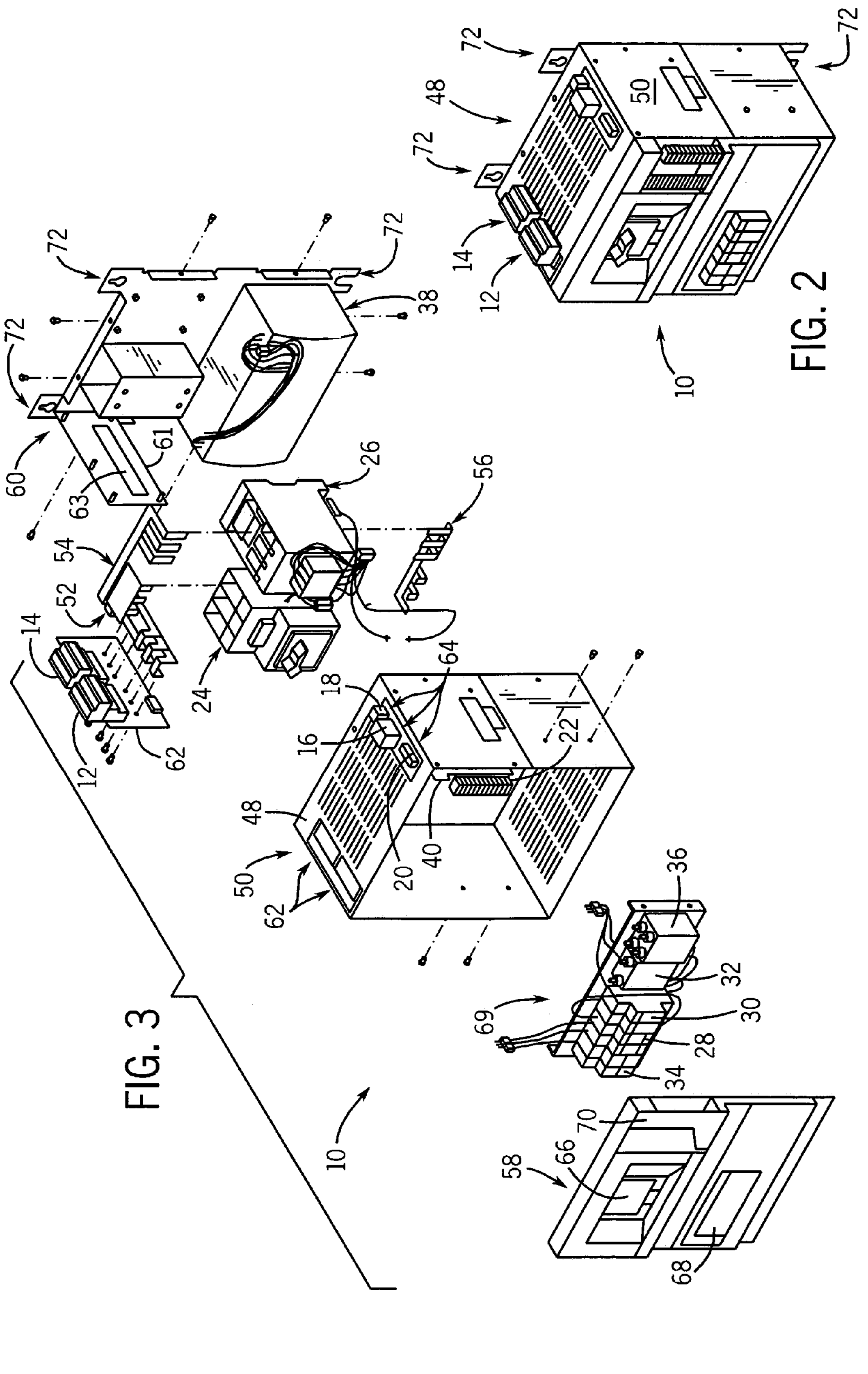
FIG. 2 is a perspective view of the power processing module of FIG. 1.
FIG. 3 is an exploded, perspective view of the power processing module of FIG. 2.

Turning to FIGS. 2 and 3, perspective views of the power processing device 10 when fully-assembled and disassembled (exploded) are shown. In particular, the power input terminal 12 is shown to extend out of a top surface 48 of a housing 50 of the power processing device 10. The power input terminal 12 is coupled to the circuit breaker 24 by way of a first set of three bus bars 52. The first power output terminal 14 is coupled to the contactor 26 by a second set of three bus bars 54. Further, the circuit breaker 24 is coupled to the contactor 26 by a third set of three bus bars 56. The first, second and third sets of three bus bars 52, 54 and 56 can also be termed line bus bars, load bus bars and jumper bus bars, respectively. Through the use of the bus bars, instead of wires, the compactness of the power processing device 10 is enhanced insofar as the bus bars can make sharp turns (e.g., 90 degree turns) that would not be possible if wire of the appropriate gauge was used. Insofar as the bus bars in the present embodiment are used to connect the power input terminal 12 to the first power output terminal 14 by way of the circuit breaker 24 and contactor 26, the bus bars in particular facilitate the branch circuit protection afforded by the circuit breaker 24.

Other components of the power processing device 10 are further evident from FIGS. 2 and 3. In particular, the fuse block 28, circuit breaker 30, filter 32, circuit breaker 34, filter 36, power converter 38 and filter 40, as well as the second, third, fourth and fifth power output terminals 16, 18, 20 and 22 respectively are all shown in one or both of FIGS. 2 and 3. The fifth power output terminal 22 in particular is mounted on a circuit board 23 that also supports the filter 40. Additionally as shown, all of these components are compactly fit within the housing 50, and front and rear panels 58 and 60 are assembled onto the housing to complete the overall device 10. Assembled to the rear panel 60 is a bracket 61 that extends perpendicularly from the rear panel. An input power circuit board 62 on which is mounted the power input terminal 12 is fastened to, and supported by, the bracket 61.

The bracket 61 includes orifices 63 for the power input terminal 12 and the first power output terminal 14, the top surface 48 of the housing 50 also includes orifices 64 for the second, third and fourth power output terminals 16, 18 and 20. The front panel 58 includes additional orifices 66 and 68 to allow for user access to the circuit breaker 24 and to an assembly 69 of the circuit breaker 34, fuse block 28 and circuit breaker 30. Also, the front panel 58 includes an access door 70 allowing access to the fifth power output terminal 22. The rear panel 60 includes mounting orifices 72 by which the power processing device 10 when assembled can be mounted to a panel or other structural component(s) associated with or nearby motion control devices (not shown).

Figure 4:
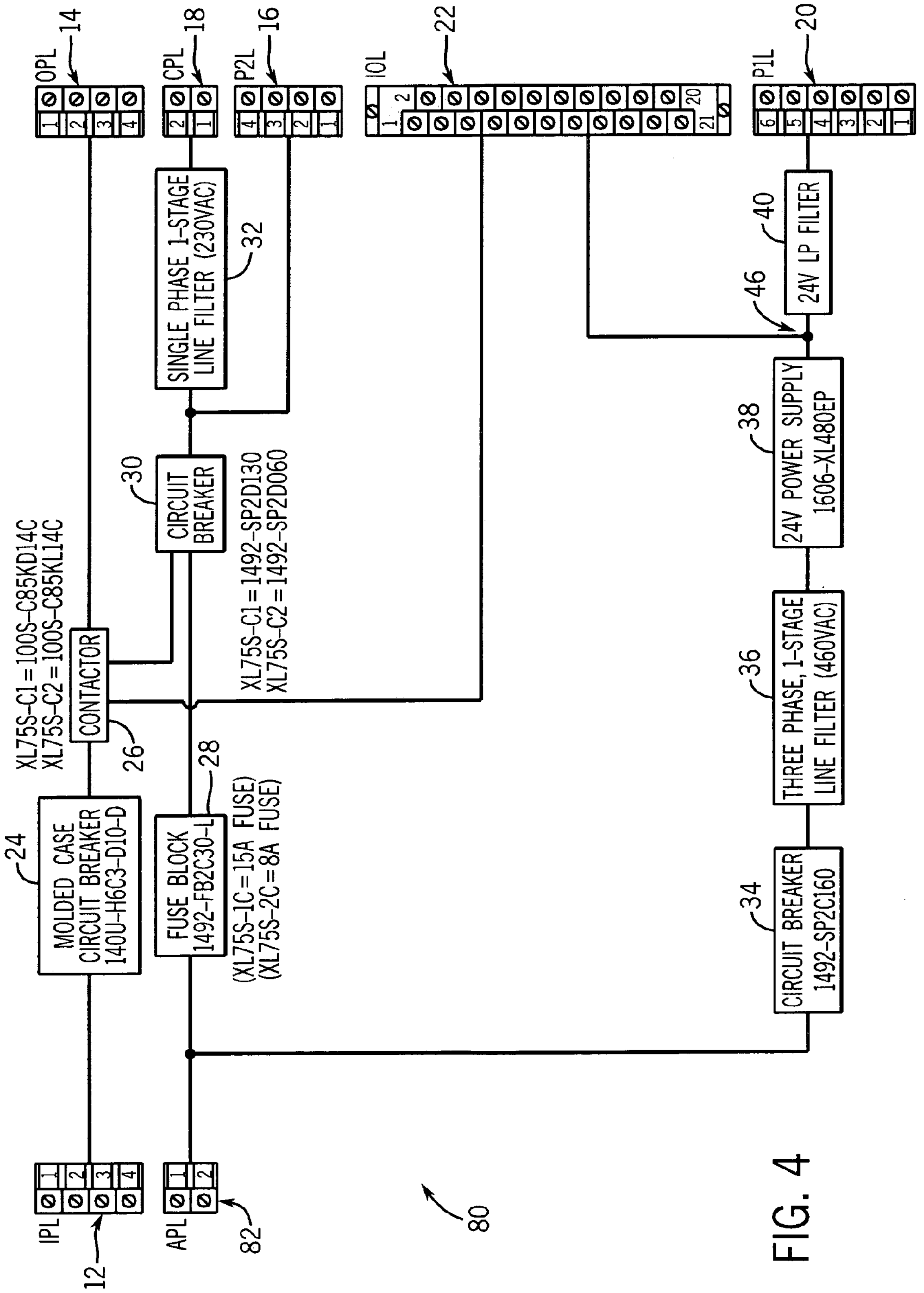
FIG. 4 is a schematic showing electronic components of a second exemplary embodiment of a power processing module, in contrast to that of FIG. 1.
Figure 5:
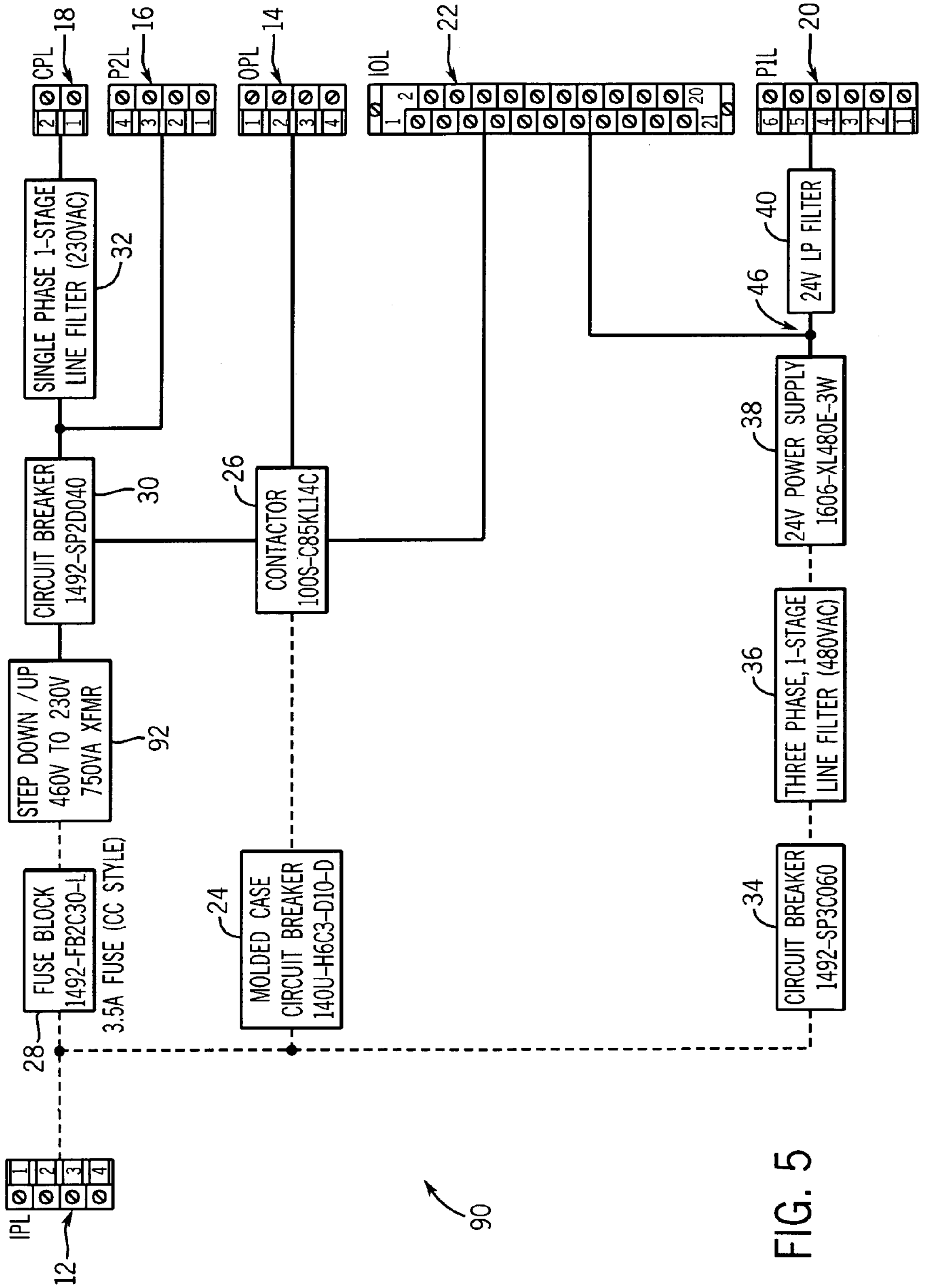
FIG. 5 is a schematic showing electronic components of a third exemplary embodiment of a power processing module, in contrast to that of FIGS. 1 and 4.

Turning to FIGS. 4 and 5, two alternate embodiments 80, 90 of power processing devices that differ in certain regards from the power processing device 10 are shown. The power processing device 80 shown in FIG. 4 in particular differs from the power processing device 10 in that it has not only a first or primary power input terminal 12 but also an auxiliary power input terminal 82. While the primary power input terminal 12 remains connected to the circuit breaker 24, as in the case of the power processing device 10, it is the auxiliary power input terminal 82 that is coupled to the fuse block 28 and to the circuit breaker 34. As for the power processing device 90 shown in FIG. 5, that power processing device is the same as that shown in FIG. 1 except insofar as it includes an additional voltage step-down (or step-up) device 92 that converts 460V power from the fuse block 28 into 230V power before it is provided to the circuit breaker 30. Otherwise the power processing devices 80, 90 are identical to the power processing device 10.

At the same time, depending upon the embodiment, the particular components that are used as the fuse block 28, circuit breakers 24, 30, contactor 26 and other components of these power processing devices 10, 80 and 90 can vary considerably in their particular identifies. For example, while in the discussion concerning FIG. 1, the fuse block 28 was specified to be a 1492-FB2C30-L fuse block having a 3.5 A fuse, in alternate embodiments, fuse blocks having 15 A or 8 A fuses could be used. Also for example, while the earlier discussion concerning the circuit breaker 30 indicated that it is a 1492-SP2D040 circuit breaker, the circuit breaker also could be a 1492-SP2D060 circuit breaker or a 1492-SP2D130 circuit breaker. Further, while the contactor 26 in FIG. 1 was indicated to be a 100S-C85KL14C contactor, in alternate embodiments it also could be 100S-C85KD14C contactor. Further, the circuit breaker 34, which was indicated previously to be a 1492-SP2C160 circuit breaker could also be a 1492-SP3C060 circuit breaker and the power converter 38, which was previously indicated to be a 1606-XL480EP 20 A power supply, could also be a 1606-XL480E-3W 20 A power supply. Additionally, in further alternate embodiments still other components could be utilized. Thus, the present invention is intended to encompass a variety of embodiments of power processing devices employing any of a variety of different components and component types, and the present invention is not intended to be limited to any particular one or more of the embodiments specifically shown in the figures and/or discussed herein.

It is specifically intended that the present invention not be limited to the embodiments and illustrations contained herein, but that modified forms of those embodiments including portions of the embodiments and combinations of elements of different embodiments also be included as come within the scope of the following claims.

We claim:

1. A power processing module for supplying power to a motion control device, the power processing module comprising:

a housing;

a first power input terminal extending through the housing;

a first power output terminal extending through the housing;

branch circuit protection circuitry;

a contactor; and a plurality of sets of bus bars, including:

a first set of bus bars coupling the first power input terminal to the branch protection circuitry, the first set of bus bars being flat strips having a first preformed 90° turn within in a first plane and second 90° turn configuring the bus bars to extend into a second plane that is perpendicular to the first plane to provide tabs in the second plane received by the branch protection circuitry, a second set of bus bars coupling the branch protection circuitry to the contactor, the second set of bus bars being flat strips having a first preformed 90° turn within in a first plane and second 90° turn configuring the bus bars to extend into a second plane that is perpendicular to the first plane to provide parallel tabs in the second plane at each end received by the branch protection circuitry and the contactor, and a third set of bus bars coupling the contactor to the first power output terminal, the third set of bus bars being flat strips having a first preformed 90° turn within in a first plane and second 90° turn configuring the bus bars to extend into a second plane that is perpendicular to the first plane to provide tabs in the second plane received by the contactor, wherein the branch circuit protection circuitry, the contactor, and the sets of bus bars are enclosed within the housing.

2. The power processing module of claim 1, wherein the branch circuit protection circuitry includes a first circuit breaker.

3. The power processing module of claim 2, wherein the first circuit breaker is a three-phase, high-current-rated thermal and magnetic molded case circuit breaker, and wherein the first power input terminal is configured to receive utility line power and the first power output terminal is configured to provide power to the motion control device.

4. The power processing module of claim 2, further including a first contactor coupled to the first circuit breaker.

5. The power processing module of claim 4, wherein the first contactor is a three-phase, high-current-rated contactor.

6. The power processing module of claim 4, wherein each of the first second and third set of bus bars includes three bus bars.

7. The power processing module of claim 6, wherein the housing is configured for attachment to a panel of the motion control device.

8. The power processing module of claim 1, further comprising:

a second power output terminal; and a fuse and a second circuit breaker coupled in series between the second power output terminal and at least one of the first power input terminal and a second power input terminal.

9. The power processing module of claim 8, wherein the fuse is a low-current fuse and the second contactor is a two-pole contactor.

10. The power processing module of claim 8, further comprising a power conversion device coupled between the fuse and the circuit breaker.

11. The power processing module of claim 8, further comprising a third power output terminal coupled to the second circuit breaker by way of a means for filtering.

12. The power processing module of claim 11, wherein the means for filtering includes a single phase, one-stage line filter, the third power output terminal provides filtered 230V control power, the second power output terminal provides unfiltered control power, and the first power output terminal provides high-current power.

13. The power processing module of claim 8, wherein it is the second power input terminal that is coupled to the fuse, wherein the second power input terminal is an auxiliary power input terminal, wherein the first power input terminal is a primary line power input terminal, and wherein the second circuit breaker is coupled to the first contactor.

14. The power processing module of claim 8, further comprising a second circuit breaker, a power converter and at lest one filter coupled in a series between the second power output terminal and at least one of the first power input terminal and a second power input terminal.

15. The power processing module of claim 14, wherein the at least one filter includes a first filter that is a three-phase, one-stage line filter and a second filter that is a low pass filter.

16. The power processing module of claim 14, wherein the power converter is an AC to DC power converter that converts high voltage AC power into low voltage DC power, and the second power output terminal provides filtered, low voltage DC power.

17. The power processing module of claim 14, further comprising an additional power output terminal that is coupled to each of the power converter and the first contactor.

18. A method of providing power to a motion control device, the method comprising:

providing a power processing device having a first power input terminal, a first power output terminal, and branch circuit protection circuitry coupled at least indirectly between the first power input terminal and the first power output terminal;

providing a plurality of sets of bus bars to couple the first power input terminal, the first power output terminal and the branch circuit protection circuitry, including coupling the first power input terminal to the branch circuit protection circuitry using a first set of bus bars, the first set of bus bars forming an L shape, one branch of the L shape having a plurality of laterally extending tabs, each tab terminating in a portion configured to couple the first set of bus bars to the branch circuit protection circuitry, coupling the branch circuit protection circuitry to a contactor using a second set of bus bars, the second set of bus bars including first and second set of laterally extending tabs, each tab of the first set of laterally extending tabs configured to couple the second set of bus bars to the branch circuit protection circuitry and each tab of the second set of laterally extending tabs configured to couple the second set of bus bars to the contactor, and coupling the contactor to the first power output terminal using a third set of bus bars, the third set of bus bars forming an L shape, one branch of the L shape having a plurality of laterally extending tabs, each tab terminating in a portion configured to couple the third set of bus bars to the contactor; and substantially enclosing the power processing device within a housing.

19. The method of claim 18, further comprising physically attaching the housing to a panel associated with the motion control device.

20. A three-phase processing device comprising:

first, second and third power input terminals;

first, second and third power output terminals, wherein at least two of the power output terminals provide dissimilar output power types;

branch circuit protection circuitry; and a plurality of sets of bus bars, including a first set of bus bars coupling the first power input terminal to the branch circuit protection circuitry, the first set of bus bars forming an L shape, one branch of the L shape having a plurality of laterally extending tabs, each tab terminating in a portion configured to couple the first set of bus bars to the branch circuit protection circuitry, a second set of bus bars coupling the branch circuit protection circuitry to a contactor, the second set of bus bars including first and second set of laterally extending tabs, each tab of the first set of laterally extending tabs configured to couple the second set of bus bars to the branch circuit protection circuitry and each tab of the second set of laterally extending tabs configured to couple the second set of bus bars to the contactor, a third set of bus bars coupling the contactor to the first power output terminal, the third set of bus bars forming an L shape, one branch of the L shape having a plurality of laterally extending tabs, each tab terminating in a portion configured to couple the third set of bus bars to the contactor, a four set of bus bars coupling the second power output terminal to at least one other component of the processing device, and a fifth set of bus bars coupling the third power output terminal to at least one other component of the processing device.

21. The three-phase power processing device of claim 20, further comprising sixth, seventh and eighth bus bars that respectively couple first, second and third intermediate ports of the branch circuit protection device with fourth, fifth and sixth intermediate ports of the branch circuit protection device.

22. A power processing module for supplying power to a motion control device, the power processing module comprising:

a power input terminal adapted to provide AC power;

a first power output terminal electrically coupled to the power input terminal through a first circuit breaker and a contactor, wherein the first power output terminal is adapted to provide AC power;

a second power output terminal electrically coupled to the power input terminal through a fuse block and a second circuit breaker, wherein the second power output terminal is adapted to provide AC power;

a third power output terminal electrically coupled to the power input terminal through a third circuit breaker and filter network, wherein the third power output terminal is adapted to provide DC power;

a plurality of sets of bus bars, including a first set of bus bars coupling the first power input terminal to the first circuit breaker, the first set of bus bars forming an L shape, one branch of the L shape having a plurality of laterally extending tabs, each tab terminating in a portion configured to couple the first set of bus bars to the first circuit breaker, a second set of bus bars coupling the second circuit breaker to the contactor, the second set of bus bars including first and second set of laterally extending tabs, each tab of the first set of laterally extending tabs configured to couple the second set of bus bars to the second circuit breaker and each tab of the second set of laterally extending tabs configured to couple the second set of bus bars to the contactor, and a third set of bus bars coupling the contactor to the first power output terminal, the third set of bus bars forming an L shape, one branch of the L shape having a plurality of laterally extending tabs, each tab terminating in a portion configured to couple the third set of bus bars to the contactor; and a housing supporting the power input terminal, the first, second, and third circuit breakers, the filter network, the contactor, the fuse block, the plurality of sets of bus bars and the first, second, and third power output terminals, the housing adapted to be mounted to a panel associated with a motion control device.

23. A power processing module of claim 22 wherein the third power output terminal is further electrically coupled to the power input terminal through a power converter in series with the third circuit breaker and the filter network.

* * * * *